(12) United States Patent
Mikladal et al.

(10) Patent No.: US 11,462,341 B2
(45) Date of Patent: Oct. 4, 2022

(54) ELECTRICALLY CONDUCTIVE MULTILAYER FILM INCLUDING A COATING LAYER

(71) Applicant: CANATU OY, Vantaa (FI)

(72) Inventors: Bjørn Fridur Mikladal, Helsinki (FI); Dewei Tian, Kerava (FI); Ilkka Varjos, Espoo (FI)

(73) Assignee: CANATU OY, Vantaa (FI)

( * ) Notice: Subject to any disclaimer, the term of this patent is extended or adjusted under 35 U.S.C. 154(b) by 0 days.

(21) Appl. No.: 17/051,078

(22) PCT Filed: May 3, 2019

(86) PCT No.: PCT/FI2019/050348
§ 371 (c)(1),
(2) Date: Oct. 27, 2020

(87) PCT Pub. No.: WO2019/215386
PCT Pub. Date: Nov. 14, 2019

(65) Prior Publication Data
US 2021/0313089 A1 Oct. 7, 2021

(30) Foreign Application Priority Data

May 9, 2018 (FI) .................................. 20185429

(51) Int. Cl.
*H01B 5/14* (2006.01)
*C01B 32/15* (2017.01)
(Continued)

(52) U.S. Cl.
CPC ................. *H01B 5/14* (2013.01); *B32B 7/12* (2013.01); *B32B 27/304* (2013.01);
(Continued)

(58) Field of Classification Search
None
See application file for complete search history.

(56) References Cited

U.S. PATENT DOCUMENTS

| 2005/0209392 | A1* | 9/2005 | Luo ................... C09D 127/18 524/496 |
| 2012/0058255 | A1 | 3/2012 | Gan et al. |

(Continued)

FOREIGN PATENT DOCUMENTS

| JP | 2009283376 A | 12/2009 |
| JP | 2013206675 A | 10/2013 |

(Continued)

OTHER PUBLICATIONS

Kirk Othmer: Encyclopedia of Chemical Technology, Fourth Edition, vol. 24, pp. 882-923 (1997), "Vinylidene Chloride Monomer and Polymers".

(Continued)

*Primary Examiner* — Katie L. Hammer
(74) *Attorney, Agent, or Firm* — Harness, Dickey & Pierce, P.L.C.

(57) ABSTRACT

An electrically conductive multilayer film is disclosed. The conductive multilayer film may comprise a non-conductive base layer and a transparent layer comprising transparent conductor material provided on the non-conductive base layer, wherein the transparent layer comprising transparent conductor material is at least partly covered with transparent dielectric material forming a coating layer on the transparent layer comprising transparent conductor material such that the transparent layer comprising transparent conductor material is situated between the coating layer and the non-conductive base layer, and wherein the thickness of the coating layer is 10-600 nm in order to enable processing of the transparent layer comprising transparent conductor (Continued)

material through the coating layer. Further is disclosed a method, a touch sensing device, and different uses.

12 Claims, 1 Drawing Sheet

(51) Int. Cl.
| | |
|---|---|
| C08J 7/044 | (2020.01) |
| C08J 7/04 | (2020.01) |
| C08J 5/18 | (2006.01) |
| C09D 5/24 | (2006.01) |
| C09D 127/08 | (2006.01) |
| C09D 133/12 | (2006.01) |
| B32B 7/12 | (2006.01) |
| B32B 27/30 | (2006.01) |
| B32B 27/36 | (2006.01) |
| B32B 37/14 | (2006.01) |
| G02F 1/1333 | (2006.01) |
| G02F 1/1343 | (2006.01) |
| C08J 7/043 | (2020.01) |
| G06F 3/041 | (2006.01) |

(52) U.S. Cl.
CPC ............ *B32B 27/365* (2013.01); *B32B 37/14* (2013.01); *C01B 32/15* (2017.08); *C08J 5/18* (2013.01); *C08J 7/043* (2020.01); *C08J 7/044* (2020.01); *C08J 7/0423* (2020.01); *C09D 5/24* (2013.01); *C09D 127/08* (2013.01); *C09D 133/12* (2013.01); *G02F 1/13338* (2013.01); *G02F 1/13439* (2013.01); *C01P 2006/40* (2013.01); *C08J 2369/00* (2013.01); *C08J 2427/08* (2013.01); *C08J 2433/12* (2013.01); *G06F 3/041* (2013.01)

(56) References Cited

U.S. PATENT DOCUMENTS

| | | |
|---|---|---|
| 2012/0235951 A1 | 9/2012 | Brown et al. |
| 2013/0022811 A1 | 1/2013 | Ahn et al. |
| 2013/0050113 A1* | 2/2013 | Brown .................. B82Y 30/00 345/173 |
| 2014/0202738 A1 | 7/2014 | Allemand et al. |
| 2015/0014030 A1 | 1/2015 | Mitamura et al. |
| 2015/0255186 A1 | 9/2015 | Tsujimoto et al. |
| 2016/0083594 A1 | 3/2016 | Bollen et al. |
| 2017/0125136 A1 | 5/2017 | Park et al. |

FOREIGN PATENT DOCUMENTS

| | | |
|---|---|---|
| WO | WO-2007/057501 A1 | 5/2007 |
| WO | WO-2009/000969 A1 | 12/2008 |

OTHER PUBLICATIONS

A. G. Nasibulin et al. "Multifunctional Free-Standing Single-Walled Carbon Nanotube Films", ACS Nano 5, pp. 3214-3221 (2011).

International Search Report and Written Opinion of the International Searching Authority, issued in PCTFI2019/050348, dated Jul. 4, 2019; ISA/FI.

International Preliminary Report on Patentability, issued in PCT/FI2019/050348, dated Aug. 3, 2020.

Search report from corresponding Finland Patent Application No. 20185429 dated Dec. 5, 2018.

* cited by examiner

ELECTRICALLY CONDUCTIVE MULTILAYER FILM INCLUDING A COATING LAYER

CROSS-REFERENCE TO RELATED APPLICATIONS

This application is a 371 U.S. National Phase of International Application No. PCT/FI2019/050348, filed on May 3, 2019, which claims priority to Finland Patent Application No. 20185429, filed May 9, 2018. The entire disclosures of the above applications are incorporated herein by reference.

TECHNICAL FIELD

The present disclosure relates to a conductive multilayer film. The present disclosure further relates to a method for producing a conductive multilayer film. The present disclosure further relates to the use of a transparent dielectric material as a coating layer, to a touch sensing device, and to the uses of the electrically conductive multilayer film and of the touch sensing device.

BACKGROUND

Conductive multilayer films are used in many different applications including touch sensing devices, photovoltaic systems, heating applications, and lighting systems. Such conductive films may be manufactured by e.g. using multiple layers of different materials, to achieve e.g. improved strength, stability, appearance or other properties from the use of differing materials. When forming a conductive film of different layers of material, their adhesion and bonding ability is of importance in order to avoid detachment of the distinct layers during the use thereof. Also, the possibility of further processing the multilayer films is of importance for producing a final product of the multilayer films.

SUMMARY

An electrically conductive multilayer film comprising a non-conductive base layer and a transparent layer comprising transparent conductor material provided on the non-conductive base layer is disclosed. The transparent layer comprising transparent conductor material is at least partly covered with transparent dielectric material forming a coating layer on the transparent layer comprising transparent conductor material. The transparent layer comprising transparent conductor material is situated between the coating layer and the non-conductive base layer. The thickness of the coating layer is 10-600 nm in order to enable processing of the transparent layer comprising transparent conductor material through the coating layer.

An electrically conductive multilayer film comprising a non-conductive base layer and a transparent layer comprising transparent conductor material provided on the non-conductive base layer is disclosed. The transparent layer comprising transparent conductor material is at least partly covered with transparent dielectric material forming a coating layer on the transparent layer comprising transparent conductor material. The transparent layer comprising transparent conductor material is situated between the coating layer and the non-conductive base layer. The transparent conductor material comprises or consists of a conductive high aspect ratio molecular structure (HARMS) network, wherein the conductive HARM network comprises carbon nanostructures, and the transparent dielectric material comprises or consists of a polymer, wherein the polymer is selected from a group consisting of polyvinylidene chloride (PVDC); a copolymer, wherein one of the monomers is vinylidene chloride; poly(methyl methacrylate) (PMMA); and any combination thereof. The thickness of the coating layer is 10-600 nm in order to enable processing of the transparent layer comprising transparent conductor material through the coating layer.

Further a method for producing an electrically conductive multilayer film is disclosed. The method comprises: providing a non-conductive base layer; providing a transparent layer comprising transparent conductor material on the non-conductive base layer; covering the transparent layer comprising transparent conductor material at least partly with transparent dielectric material to form a coating layer on the transparent layer comprising transparent conductor material such that the transparent layer comprising transparent conductor material is situated between the coating layer and the non-conductive base layer, wherein the thickness of the coating layer is 10-600 nm in order to enable processing of the transparent layer comprising transparent conductor material through the coating layer.

Further a method for producing an electrically conductive multilayer film is disclosed. The method comprises: providing a non-conductive base layer; providing a transparent layer comprising transparent conductor material on the non-conductive base layer, wherein the transparent conductor material comprises or consists of a conductive high aspect ratio molecular structure (HARMS) network, wherein the conductive HARMS network comprises carbon nanostructures; covering the transparent layer comprising transparent conductor material at least partly with transparent dielectric material to form a coating layer on the transparent layer comprising transparent conductor material such that the transparent layer comprising transparent conductor material is situated between the coating layer and the non-conductive base layer, wherein the transparent dielectric material comprises or consists of a polymer, wherein the polymer is selected from a group consisting of polyvinylidene chloride (PVDC); a copolymer, wherein one of the monomers is vinylidene chloride; poly(methyl methacrylate) (PMMA); and any combination thereof, and wherein the thickness of the coating layer is 10-600 nm in order to enable processing of the transparent layer comprising transparent conductor material through the coating layer.

Further, the use of a transparent dielectric material as a coating layer having a thickness of 10-600 nm in a multilayer film is disclosed.

Further, a touch sensing device comprising an electrically conductive multilayer film as disclosed in the present application is disclosed.

Further, the use of an electrically conductive multilayer film as disclosed in the present application is disclosed.

Further, the use of a touch sensing device as disclosed in the present application is disclosed.

BRIEF DESCRIPTION OF THE DRAWINGS

The accompanying drawings, which are included to provide a further understanding of the embodiments and constitute a part of this specification, illustrate various embodiments. In the drawings.

DETAILED DESCRIPTION

Figure 1:
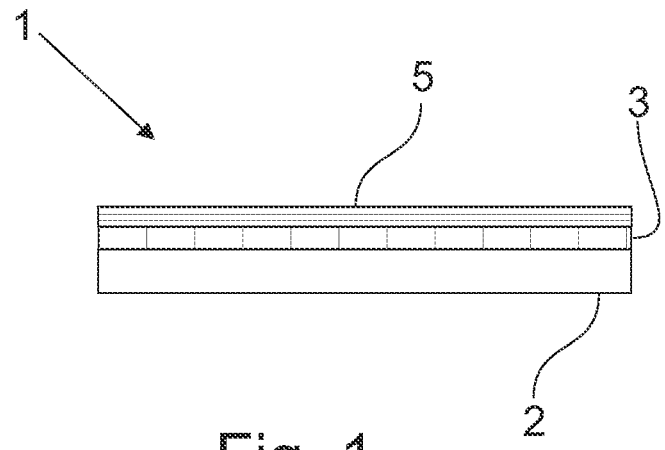
FIG. 1 illustrates schematically a sectional view of an electrically conductive multilayer film according to one embodiment.

The present application relates to an electrically conductive multilayer film comprising a non-conductive base layer and a transparent layer comprising transparent conductor material provided on the non-conductive base layer. The transparent layer comprising transparent conductor material is at least partly covered with transparent dielectric material forming a coating layer on the transparent layer comprising transparent conductor material. The transparent layer comprising transparent conductor material is situated between the coating layer and the non-conductive base layer. The thickness of the coating layer is 10-600 nm in order to enable processing of the transparent layer comprising transparent conductor material through the coating layer.

The present application relates to an electrically conductive multilayer film comprising a non-conductive base layer and a transparent layer comprising transparent conductor material provided on the non-conductive base layer. The transparent layer comprising transparent conductor material is at least partly covered with transparent dielectric material forming a coating layer on the transparent layer comprising transparent conductor material. The transparent layer comprising transparent conductor material is situated between the coating layer and the non-conductive base layer. The transparent conductor material comprises or consists of a conductive high aspect ratio molecular structure (HARMS) network, wherein the conductive HARM network comprises carbon nanostructures. The transparent dielectric material comprises or consists of a polymer, wherein the polymer is selected from a group consisting of polyvinylidene chloride (PVDC); a copolymer, wherein one of the monomers is vinylidene chloride; poly(methyl methacrylate) (PMMA); and any combination thereof. The thickness of the coating layer is 10-600 nm in order to enable processing of the transparent layer comprising transparent conductor material through the coating layer.

In one embodiment, the processing of the transparent layer comprising transparent conductor material through the coating layer comprises laser etching (patterning), printing of electric contacts (screen printing), or any other type of processing, of the transparent layer comprising transparent conductor material. In one embodiment, printing of electric contacts comprises printing of Ag contacts.

The present application further relates to a method for producing a conductive multilayer film, wherein the method comprises:
providing a non-conductive base layer,
providing a transparent layer comprising transparent conductor material on the non-conductive base layer,
covering the transparent layer comprising transparent conductor material at least partly with transparent dielectric material to form a coating layer on the transparent layer comprising transparent conductor material such that the transparent layer comprising transparent conductor material is situated between the coating layer and the non-conductive base layer, wherein the thickness of the coating layer is 10-600 nm in order to enable processing of the transparent layer comprising transparent conductor material through the coating layer.

The present application further relates to a method for producing a conductive multilayer film, wherein the method comprises:
providing a non-conductive base layer,
providing a transparent layer comprising transparent conductor material on the non-conductive base layer, wherein the transparent conductor material comprises or consists of a conductive high aspect ratio molecular structure (HARMS) network, wherein the conductive HARMS network comprises carbon nanostructures,
covering the transparent layer comprising transparent conductor material at least partly with transparent dielectric material to form a coating layer on the transparent layer comprising transparent conductor material such that the transparent layer comprising transparent conductor material is situated between the coating layer and the non-conductive base layer, wherein the transparent dielectric material comprises or consists of a polymer, wherein the polymer is selected from a group consisting of polyvinylidene chloride (PVDC); a copolymer, wherein one of the monomers is vinylidene chloride; poly(methyl methacrylate) (PMMA); and any combination thereof, and wherein the thickness of the coating layer is 10-600 nm in order to enable processing of the transparent layer comprising transparent conductor material through the coating layer.

The present application further relates to the use of a transparent dielectric material as a coating layer having a thickness of 10-600 nm in a multilayer film according to the present application, for protecting the transparent layer comprising transparent conductor material, for improving the adhesion of the transparent layer comprising transparent conductor material to the non-conductive base layer, for improving the electrical performance of the conductive multilayer film, and/or for strengthening the mechanical and/or environmental stability of the conductive multilayer film.

The inventors surprisingly found out that it was possible to provide the transparent layer comprising transparent conductor material with a coating layer of transparent dielectric material thereon to provide protection of the transparent layer comprising transparent conductor material while simultaneously enabling further processing, such as patterning, printing of electric contacts, or any other processing step, of the transparent layer comprising transparent conductor material to be carried out in order to manufacture the final product.

The present application further relates to a touch sensing device comprising an electrically conductive multilayer film according to the present application.

The present application further relates to the use of an electrically conductive multilayer film according to the present application in a touch sensor, in a photovoltaic system, in a heating application, in a current conductor, in a display system, in a display electrode, in a lighting system, in a light switch, or in a light control film.

The present application further relates to the use of a touch sensing device according to the present application in a photovoltaic system, in a heating application, in a current conductor, in a display system, in a display electrode, in a lighting system, in a light switch, or in a light control film.

The expression that the transparent layer comprising transparent conductor material is provided "on" another layer should be understood in this specification, unless otherwise stated, as meaning that the transparent layer comprising transparent conductor material is provided or formed to lie on or upon another layer or is being at least partly embedded therein. The layer, e.g. the non-conductive base layer or a transparent primer layer, may serve as a carrier or support structure for the transparent layer comprising transparent conductor material.

The term "comprising" is used in this specification to mean including the feature(s) or act(s) followed thereafter, without excluding the presence of one or more additional features or acts.

It will further be understood that reference to "an" item refers to one or more of those items.

The expression "film" should be understood in this specification, unless otherwise stated, as referring to a structure having its lateral dimensions substantially larger than its thickness. In that sense, a film may be considered as being a "thin" structure.

In one embodiment, the thickness of the electrically conductive multilayer film is 0.5 nm-6 mm. In one embodiment, the thickness of the electrically conductive multilayer film is 0.5 nm-1000 nm. In one embodiment, the thickness of the electrically conductive multilayer film is 0.1 µm-5 mm.

The expression that the base layer is "non-conductive" should be understood in this specification, unless otherwise stated, as meaning that the base layer has a sheet resistance of 10 Mohms/square or higher.

The expression "transparent" should be understood in this specification, unless otherwise stated, as referring to optical transparency of the film, layer, or the parts and materials thereof in the relevant wavelength range at issue. In other words, "transparent" material or structure refers to a material or structure allowing light, or generally electromagnetic radiation, at such relevant wavelength to propagate through such material or structure. The relevant wavelength range may depend on the application where the electrically conductive multilayer film is to be used. In one embodiment, the relevant wavelength range is the visible wavelength range of about 390 to about 700 nm. In one embodiment, the relevant wavelength range is the infrared radiation wavelength range of about 700 to about 1000 nm.

Further, the transparency of the film, layer or the parts thereof primarily refers to the transparency in the thickness direction of the film, layer, or the parts thereof so that in order to be "transparent", sufficient portion of light energy incident on the film, layer, or a part thereof shall propagate through it in the thickness direction. Such sufficient portion may depend on the application in which the film is to be used. In one embodiment, the transmittance of the film, layer, or the parts thereof is 20-99.99% of the energy of light incident perpendicularly thereon. In one embodiment, said transmittance is 20% or higher, or 30% or higher, or 40% or higher, or 50% or higher, or 60% or higher, or 70% or higher, or 80% or higher, 90% or higher. The transmittance may be measured according to standard JIS-K7361, ASTM D1003.

In one embodiment, the transparent conductor material is partly embedded in the transparent dielectric material such that at least part of the transparent conductor material is exposed. In one embodiment, the transparent conductor material is partly embedded in the transparent dielectric material such that at least part of the transparent conductor material extends out of the coating layer.

In one embodiment, the transparent dielectric material comprises or consists of a polymer. In one embodiment, the transparent dielectric material comprises or consists of a polymer, wherein the polymer is selected from a group consisting of polyvinylidene chloride (PVDC), a copolymer, wherein one of the monomers is vinylidene chloride, poly(methyl methacrylate) (PMMA), polycarbonate (PC), and any combination thereof. In one embodiment, the transparent dielectric material comprises or consists of a polymer, wherein the polymer is selected from a group consisting of polyvinylidene chloride (PVDC), poly(methyl methacrylate) (PMMA), polycarbonate (PC), low-density polyethylene (LDPE), polypropylene (PP), polyurethane (PU), polyethylene terephthalate (PET), ethylene vinyl alcohol (EVOH), and any combination thereof. In one embodiment, the polymer is selected from a group consisting of polyvinylidene chloride, a copolymer, wherein one of the monomers is vinylidene chloride, and any combination thereof. In one embodiment, the polymer is polycarbonate.

In one embodiment, the coating layer comprises 0.005-0.06 mg, or 0.005-0.03 mg of the polymer per $cm^2$. In one embodiment, the coating layer comprises 90-100 weight-%, or 95-99 weight-%, or 96-98 weight-% of the transparent dielectric material, e.g. the polymer, based on the total weight of the coating layer. In one embodiment, the coating layer of transparent dielectric material is formed by using a composition comprising 0.1-100%, or 0.1-30%, or 0.1-15%, or 0.1-6%, or 0.3-5%, or 0.5-4%, of the polymer by weight based on the total volume of the composition.

In one embodiment, the transparent dielectric material further comprises a solvent, an optical absorbing additive, a dopant, an adhesion promoter, a hardener, or any combination thereof. The optical absorbing additive may provide protection against environmental UV radiation.

In one embodiment, the thickness of the coating layer is 20-500 nm, or 30-400 nm, or 50-300 nm, or 60-200 nm, or 70-150 nm. In one embodiment, the thickness of the coating layer is 50-150 nm.

In one embodiment, the electrically conductive multilayer film comprises a transparent primer layer, which is situated between the non-conductive base layer and the transparent layer comprising transparent conductor material. In one embodiment, the electrically conductive multilayer film comprises a transparent primer layer, which is situated between the non-conductive base layer and the transparent layer comprising transparent conductor material and is in direct contact with the transparent layer comprising transparent conductor material. In one embodiment, the transparent primer layer is in direct contact with the non-conductive base layer and with the transparent layer comprising transparent conductor material. In one embodiment, the transparent conductor material is at least partly embedded into the transparent primer layer.

In one embodiment, the transparent primer layer comprises or consists of a polymer, wherein the polymer is selected from a group consisting of polyvinylidene chloride, a copolymer, wherein one of the monomers is vinylidene chloride, and any combination thereof. In one embodiment, the transparent primer layer is formed of a composition comprising or consisting of a polymer, wherein the polymer is selected from a group consisting of polyvinylidene chloride, a copolymer, wherein one of the monomers is vinylidene chloride, and any combination thereof. In one embodiment, the main component of the copolymer is vinylidene chloride. In one embodiment, the copolymer is a copolymer of vinylidene chloride and vinyl chloride (VDC-VC copolymer). In one embodiment, the copolymer comprises, in addition to vinylidene chloride, at least one monomer selected from a group consisting of vinyl chloride, vinyl acrylate, vinyl methacrylate, and acrylonitrile. In one embodiment, the transparent primer layer comprises 0.02-0.2 mg, or 0.02-0.1 mg, of the polymer per $cm^2$. In one embodiment, the transparent primer layer comprises 90-100 weight-%, or 95-99 weight-%, or 96-98 weight-% of the polymer based on the total weight of the transparent primer layer. In one embodiment, transparent primer layer is formed by using a composition comprising 0.1-100%, or 0.1-30%, or 0.1-15%, or 0.5-8%, or 2-6%, or 3-5%, or about 4%, of the polymer by weight based on the total volume of the composition. In one embodiment, the composition comprises, in addition to the polymer, a solvent. In one embodiment, the composition consists of a polymer and a solvent. In one embodiment, the composition consists of a polymer and a solvent, and optionally at least one additive. In one embodiment, the composition comprises at least one additive. In one embodiment, the at least one additive is selected from a group consisting of a plasticizer, a wax, a resin, a filler, a pigment, a dye, an anti-corrosive, a stabilizer, and an UV absorber.

The inventors surprisingly found out that using a composition comprising a polymer that is polyvinylidene chloride, a copolymer of vinylidene chloride, or a combination thereof, as the material of the transparent primer layer improves the adhesion of the transparent layer comprising transparent conductor material to the non-conductive base layer and thus enables a prolonged life time of the formed conductive multilayer film. Further, the inventors surprisingly noted that the use of a composition comprising a polymer that is polyvinylidene chloride, a copolymer of vinylidene chloride, or a combination thereof, as the material of the transparent primer layer has the added utility of improving the stability of the electrical conductivity of the conductive multilayer film. The use of the transparent primer layer has the added utility of improving the electrical conductivity of the electrically conductive multilayer film by making the sheet resistance thereof more stable.

In one embodiment, the non-conductive base layer comprises or consists of polycarbonate, the transparent conductor material comprises or consists of a conductive HARMS network, and the transparent primer layer is formed of the composition comprising or consisting of a polymer, wherein the polymer is selected from a group consisting of polyvinylidene chloride, a copolymer, wherein one of the monomers is vinylidene chloride, or a combination thereof.

In one embodiment, the thickness of the transparent primer layer is at least 50 nm and at most μm. In one embodiment, the thickness of the transparent primer layer is at least 50 nm, or 50-2000, or 50-1000 nm, or 150-500 nm. If the thickness of the transparent primer layer is thinner than 50 nm, then the sheet resistance may increase faster compared to the situation when the thickness is at least 50 nm. Keeping the thickness of the transparent primer layer at a value of at most 2000 nm, e.g. at most 1000 nm, has the added utility that the optical property is not degraded as may be the situation if the thickness is above 2000 nm. However, in some embodiments the thickness of the transparent primer layer may be thicker, e.g. in the situation that the non-conductive base layer is a non-conductive non-transparent base layer.

In one embodiment, the non-conductive base layer is a non-conductive non-transparent base layer. In one embodiment, the non-conductive base layer is a non-conductive transparent base layer. In one embodiment, the non-conductive base layer is translucent and/or opaque.

In one embodiment, the non-conductive base layer is made of dielectric material. In one embodiment, the material used to form the non-conductive base layer should be suitable for serving as a substrate for the transparent primer layer as well as for the transparent layer comprising transparent conductor material. In one embodiment, the non-conductive base layer comprises or consists of polymer or glass. In one embodiment, the non-conductive base layer is formed of transparent plastic material. In one embodiment, the material of the non-conductive base layer is selected from a group consisting of polyethylene terephthalate (PET), polycarbonate (PC), polymethyl methacrylate (PMMA), cyclic olefin polymer (COP), triacetate (TAC), cyclic Olefin Copolymer (COC), poly(vinyl chloride) (PVC), poly(ethylene 2,6-naphthalate (PEN), polyimide (PI), polypropylene (PP), polyethylene (PE), and any combination thereof. In one embodiment, the material of the non-conductive base layer is selected from a group consisting of float glass (comprising of $SiO_2$, $Na_2O$, CaO, MgO), sodalime, aluminosilicate glass, and borosilicate glass. The material of the non-conductive base layer is not, however, limited to these examples.

In one embodiment, the non-conductive base layer has a thickness of 1-5000 μm, or 10-2000 μm, or 30 to 500 μm, or 50-300 μm. However, the non-conductive base layer may also be thicker in some applications.

In one embodiment, no further adhesive is used to bond together the non-conductive base layer, the transparent primer layer and/or the transparent layer comprising transparent conductor material.

The transparent conductor material may comprise any appropriate, sufficiently transparent conductor material or any combination of such materials.

In one embodiment, the transparent conductor material comprises or consists of a conductive high aspect ratio molecular structure (HARMS) network. In one embodiment, the transparent conductor material comprises a conductive high aspect ratio molecular structure (HARMS) network.

A conductive "HARMS" or a "HARM structure" refers to electrically conductive "nanostructures", i.e. structures with one or more characteristic dimensions in nanometer scale, i.e. less or equal than about 100 nanometers. "High aspect ratio" refers to dimensions of the conductive structures in two perpendicular directions being in significantly different magnitudes of order. For example, a nanostructure may have a length which is tens or hundreds times higher than its thickness and/or width. In a HARMS network, a great number of said nanostructures are interconnected with each other to form a network of electrically interconnected molecules. As considered at a macroscopic scale, a HARMS network forms a solid, monolithic material in which the individual molecular structures are disoriented or non-oriented, i.e. are oriented substantially randomly, or oriented. Various types of HARMS networks can be produced in the form of thin transparent layers with reasonable resistivity.

In one embodiment, the conductive HARM structures comprise metal nanowires, such as silver nanowires.

In one embodiment, the conductive HARM network comprises carbon nanostructures. In one embodiment, the carbon nanostructures comprise carbon nanotubes, carbon nanobuds, carbon nanoribbons, or any combination thereof. In one embodiment, the carbon nanostructures comprise carbon nanobuds, i.e. carbon nanobud molecules. The carbon nanobuds or the carbon nanobud molecules, have fullerene or fullerene-like molecules covalently bonded to the side of a tubular carbon molecule. Carbon nanostructures, especially carbon nanobuds, may provide advantageous both from electrical, optical (transparency), and mechanical (robustness combined with flexibility and/or deformability) points of view.

In one embodiment, the transparent conductor material comprises or consists of a transparent conductive oxide. In one embodiment, the transparent conductor material comprises or consists of indium tin oxide (ITO), zinc oxide, aluminium-doped zinc oxide (AZO), fluorine doped tin oxide (FTC)), or any combination thereof. In one embodiment, the transparent conductor material comprises a transparent conductive oxide. In one embodiment, the transparent conductive oxide is indium tin oxide (ITO), zinc oxide, aluminium-doped zinc oxide (AZO), fluorine doped tin oxide (FTO), or any combination thereof. In one embodiment, the transparent conductive oxide is doped with a doping agent, such as fluorine.

In one embodiment, the transparent conductor material comprises or consists of graphene, silver nanowires, poly (3,4-ethylenedioxythiophene) PEDOT, poly(3,4-ethylenedioxythiophene) polystyrene sulfonate PEDOT:PSS, polyaniline, a metal mesh conductor, or any combination thereof. In one embodiment, the transparent conductor material comprises graphene, silver nanowires, poly(3,4-ethylenedioxythiophene) PEDOT, poly(3,4-ethylenedioxythiophene) polystyrene sulfonate PEDOT:PSS, polyaniline, a metal mesh conductor, or any combination thereof.

In one embodiment, the transparent conductor material is doped.

The thickness of a transparent layer comprising transparent conductor material may be designed in accordance with the properties of the transparent conductive material, especially the resistivity or conductivity thereof. For example, in the case of the transparent conductor material comprising carbon nanostructures, the transparent layer may have, for example, a thickness of 1-1000 nm. In one embodiment, the thickness of the transparent layer comprising transparent conductor material is 0.1-1000 nm, or 10-100 nm, or 100-500 nm.

In one embodiment, the method comprises providing a non-conductive base layer. In one embodiment, providing a non-conductive base layer comprises making available, a complete non-conductive base layer formed and manufactured beforehand. Such non-conductive base layer may be first prepared, by any appropriate process. In one embodiment, the non-conductive base layer is provided by an extrusion process and/or a casting process. In one embodiment, providing a non-conductive base layer comprises manufacturing the non-conductive base layer as a part of the method for producing the conductive multilayer film. In one embodiment, the non-conductive base layer comprises of at least two layers of different materials or of the same material. I.e. the non-conductive base layer can be formed of e.g. extruded or coated layers arranged one on the other.

In one embodiment, the method comprises providing a transparent primer layer on the non-conductive based layer. In one embodiment, the transparent primer layer is provided on the non-conductive base layer by using a coating process. In one embodiment, the transparent primer layer is provided by using slot die coating, roller coating, rod coating, curtain coating, inkjet printing, a dip coating, or screen printing.

In one embodiment, providing, on the non-conductive base layer or on the transparent primer layer, the transparent layer comprising transparent conductor material comprises forming or depositing transparent conductor material on the non-conductive base layer or on the transparent primer layer.

Depending on the material of the transparent layer comprising transparent conductor material, various procedures existing in the art may be used for providing the transparent layer comprising transparent conductor material. For example, ITO may be deposited by sputtering in vacuum conditions. PEDOT or silver nanowires may be formed, for example, by printing. Metal meshes may be formed, for example, by printing or electroplating or by any other appropriate method.

In the case of the transparent conductor material comprising carbon nanostructures, such as carbon nanobud molecules, deposition may be carried out, for example, by using the commonly known methods of filtration from gas phase or from liquid, deposition in a force field, or deposition from a solution using spray coating or spin drying. The carbon nanobud molecules can be synthesized, for example, using the method disclosed in WO 2007/057501, and deposited on a substrate, for example, directly from the aerosol flow, e.g. by assistance of e.g. electrophoresis or thermophoresis, or by a method described in Nasibulin et al: "Multifunctional Free-Standing Single-Walled 20 Carbon Nanotube Films", ACS NANO, vol. 5, no. 4, 3214-3221, 2011.

In one embodiment, the transparent conductor material is formed or deposited in a predetermined pattern. In one embodiment, a predetermined pattern is formed in the transparent layer after having formed or deposited the transparent conductor material. In said patterning, various processes may be used. In one embodiment, a laser process, an etching process, direct printing, a mechanical process, a burning process, or any combination thereof, is used for the patterning. In one embodiment, the laser process is laser ablation. In one embodiment, the etching process is a photolithographic process. In one embodiment, the pattern is formed simultaneously or after the transparent layer is formed or deposited.

In one embodiment, covering the transparent layer comprising transparent conductor material at least partly with transparent dielectric material is carried out by using at least one of the following processes: slot die coating, meniscus coating, roller coating, screen printing, gravure coating, flexo coating, offset coating, knife coating, kiss coating, rod coating, blade coating, physical vapor deposition.

In one embodiment, at least one metallic contact pad is provided. In one embodiment, at least one metallic contact pad is provided on the transparent layer comprising transparent conductor material. In one embodiment, the at least one metallic contact pad is provided by using screen printing or ink-jet printing. In one embodiment, the at least one metallic contact pad comprises silver, gold, copper or any combination thereof.

In one embodiment, the electrically conductive multilayer film comprises at least one additional component attached thereto. In one embodiment, the additional component is essentially transparent. In one embodiment, the additional component is essentially non-transparent. In one embodiment, the additional component is selected from a group consisting of a silicon chip, a piezo vibrator, a force sensor, a light emitting diode (LED), and a light guide. In one embodiment, the electrically conductive multilayer film is provided with at least one additional component attached thereto, wherein the additional component is selected from a group consisting of a silicon chip, a piezo vibrator, a force sensor, a light emitting diode (LED), and a light guide.

In one embodiment, the method comprises providing at least one additional layer on the conductive multilayer film. In one embodiment, the electrically conductive multilayer film comprises or is provided with at least one additional layer. In one embodiment, at least one of the at least one additional layers is essentially transparent. In one embodiment, at least one of the at least one additional layers is essentially non-transparent. In one embodiment, at least one of the at least one additional layers is a decorative layer. The decorative layer may for example be used to form a pattern on the electrically conductive multilayer film e.g. to provide location information for touch. In one embodiment, a protecting layer is provided on the conductive multilayer film. The additional layer may comprise base or cover plates. Any of the base and cover plates may comprise a transparent plastic material, such as acrylate or PC or a multilayer laminate of these, or a glass material, such as a float glass (comprising of $SiO_2$, $Na_2O$, CaO, MgO), sodalime, or aluminosilicate or borosilicate glass, or a laminate consisting of such glass and/or plastic materials. A typical automotive safety glass may comprise two float glass sheets with a plastic e.g. polyvinyl butyral (PVB) embedded in-between.

In one embodiment, the electrically conductive multilayer film is subjected to thermoforming and/or injection molding. In one embodiment, the electrically conductive multilayer film is formed to have a three-dimensional shape.

In one embodiment, the electrically conductive multilayer film is formable, flexible, foldable, and/or stretchable. In one embodiment, the electrically conductive multilayer film is formable and/or stretchable. In one embodiment, the electrically conductive multilayer film is formable and stretchable. In one embodiment, the electrically conductive multilayer film is formable.

In one embodiment, the electrically conductive multilayer film is formed as a flexible structure so as to allow bending thereof, preferably reversibly and repeatedly, along a three dimensional surface in at least one direction. In one embodiment, the electrically conductive multilayer film is bendable in at least one direction. In one embodiment, the electrically conductive multilayer film is bendable in at least two directions simultaneously. Depending on the material used for producing the conductive multilayer film, the smallest radius of curvature in which the electrically conductive multilayer film may be bent may lie, for example, in the range of 0.5 mm to 3 or 10 mm. In one embodiment, the radius of curvature in which the electrically conductive multilayer film may be bent lies in the range of 0.5 mm to 3 or 10 mm. The smallest radius of curvature may be achieved for transparent layers comprising carbon nanostructures such as carbon nanobuds, whereas for other materials, the lowest possible radius of curvature may be higher.

In one embodiment, the electrically conductive multilayer film is formed as a deformable structure so as to allow deforming of the electrically conductive multilayer film along a three dimensional surface. Said deforming may be based on, for example, stretchability of the conductive multilayer film, and may be carried out, for example, by using thermoforming. Flexibility and/or deformability may have the added utility of enabling use of the electrically conductive multilayer film as a curved, or generally three dimensionally shaped structure, such as a dome shaped structure.

The embodiments described hereinbefore may be used in any combination with each other. Several of the embodiments may be combined together to form a further embodiment. A conductive multilayer film, a method, a use, or a touch sensing device, to which the application is related, may comprise at least one of the embodiments described hereinbefore. It will be understood that the benefits and advantages described herein may relate to one embodiment or may relate to several embodiments. The embodiments are not limited to those that solve any or all of the stated problems or those that have any or all of the stated benefits and advantages.

The electrically conductive multilayer film as described in this application has the added utility of having an improved adhesion of the transparent layer comprising transparent conductor material to the non-conductive base layer. The use of the thin coating layer of transparent dielectric material has the added utility of providing increased adhesion of the transparent layer comprising transparent conductor material to the non-conductive base layer as well as protection to the transparent layer comprising transparent conductor material while simultaneously enabling the transparent layer comprising transparent conductor material to be further processed, i.e. subjected to patterning or printing of electric contacts, in order to produce a final product thereof. The use of the coating layer of transparent dielectric material as described in this application in the electrically conductive multilayer film as described in this application has the added utility of improving the environmental stability of the electrically conductive multilayer film as well as improving the optical reliability of the conductive multilayer film.

EXAMPLES

Reference will now be made in detail to various embodiments, an example of which is illustrated in the accompanying drawing.

The description below discloses some embodiments in such a detail that a person skilled in the art is able to utilize the embodiments based on the disclosure. Not all steps or features of the embodiments are discussed in detail, as many of the steps or features will be obvious for the person skilled in the art based on this specification.

For reasons of simplicity, item numbers will be maintained in the following exemplary embodiments in the case of repeating components.

FIG. 1 illustrates schematically a sectional view of an electrically conductive multilayer film 1 according to one embodiment described in this description. From FIG. 1 one can see an electrically conductive multilayer film 1 comprising a non-conductive base layer 2 and a transparent layer comprising transparent conductor material 3 provided on the non-conductive base layer 2. Further, the transparent layer comprising transparent conductor material 3 is at least partly covered with transparent dielectric material forming a coating layer 5. The transparent layer comprising transparent conductor material 3 is situated between the coating layer 5 and the non-conductive base layer 2. The thickness of the coating layer 5 is 10-600 nm.

Figure 2:
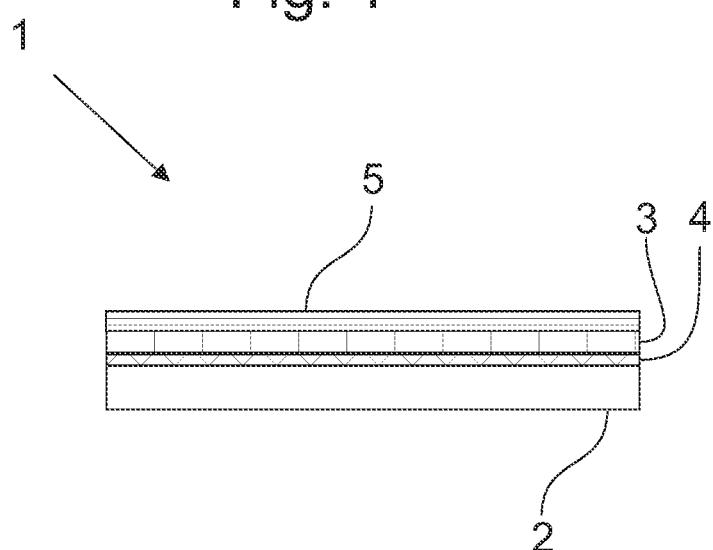
FIG. 2 illustrates schematically a sectional view of an electrically conductive multilayer film according to one embodiment.

FIG. 2 illustrates schematically a sectional view of an electrically conductive multilayer film 1 as described in view of FIG. 1 with the addition that a transparent primer layer 4 is formed between the non-conductive base layer 2 and the transparent layer comprising transparent conductor material 3.

The electrically conductive multilayer film 1 may comprise additional components thereon or attached thereto as will be clear to the skilled person even though these additional components are not illustrated in the accompanying figures.

Example 1—Producing Electrically Conductive Multilayer Films

In this example two different electrically conductive multilayer films, i.e. electrically conductive multilayer film 1 and electrically conductive multilayer film 2, were produced by using the following materials:

The Materials Used for Producing the Electrically Conductive Multilayer Film 1:

| non-conductive base layer | transparent polycarbonate |
|---|---|
| transparent conductor material | carbon nanobud molecules (CNB) |
| coating layer | PVDC co-polymer* |

*The PVDC co-polymer was a copolymer based on vinylidene chloride and vinyl chloride The Materials Used for Producing the Electrically Conductive Multilayer Film 2:

| non-conductive base layer | transparent polycarbonate |
|---|---|
| transparent conductor material | carbon nanobud molecules (CNB) |
| coating layer | PMMA |

Further, a comparative electrically conductive multilayer film C was produced by using the following materials:
The Materials Used for Producing the Comparative Electrically Conductive Multilayer Film C:

| non-conductive base layer | transparent polycarbonate |
|---|---|
| trasparent conductor material | carbon nanobud molecules (CNB) |
| coating layer | — |

Firstly, the non-conductive base layers were provided. The thickness of the non-conductive base layer was 250 μm.

Then a transparent layer comprising transparent conductor material was provided on the non-conductive base layer. The carbon nanobud molecules used in this example as the transparent conductor material can be synthesized from, for instance, a carbon source e.g. carbon monoxide using catalyst precursors such as ferrocene, or catalysts generated from a hot wire generator, such as metal particles and additional agents which, in addition to promoting the growth of nanobud molecules, increase the purity of the product. Details of the synthesis process can be found in publication WO 2007/057501 A1.

The carbon nanobud molecules were deposited as described in publication WO 2009/000969 on a nitrocellulose filter and then press transferred on the non-conductive base layer to form a transparent layer comprising transparent conductor material thereon.

After the deposition, the transparent conductor material was exposed to a solvent solution containing a gold chloride compound that was able to p-dope the carbon nanobud molecules (process step: p-doping). After the p-doping, drying was carried out in an air circulated convection oven to improve bonding of the carbon nanobud molecules and to remove residual moisture (process step: drying).

Thereafter, the transparent layer comprising transparent conductor material was covered with transparent dielectric material to form the coating layer. The coating layer was provided for the electrically conductive multilayer films 1 and 2. The coating layer was formed by covering the transparent layer comprising transparent conductor material with a composition of the selected polymer and a solvent (methyl isobutyl ketone (MIBK)) using slot-die coating (process step: coating). The thickness of the dried coating layer was about 100 nm. After the slot-die coating, drying was carried out for about 10 minutes at a temperature of 100° C.

The comparative electrically conductive multilayer film C was produced in an otherwise similar manner as the electrically conductive multilayer films 1 and 2, except that no coating layer was formed on the transparent layer comprising transparent conductor material.

Thereafter, contact pads of silver were printed by silk-screen printing on the coating layer and where after they partially dissolved through the coating layer and on to the transparent layer comprising transparent conductor material. The formed electrically conductive multilayer films were then allowed to dry for about 10 minutes at 100° C. (process step: silver contact printing).

Having produced the conductive multilayer films as above described, the films were put through a TekNek contact cleaner with double sided elastomer rolls in order to remove dust and particles therefrom (process step: contact cleaning).

Thereafter, the three electrically conductive multilayer films were subjected to accelerated aging by keeping them at a temperature of 85° C. and at 85% relative humidity for 72 hours (process step: accelerated aging). The apparatus used was an environmental chamber of the model Weiss WKL 100.

Sheet Resistance Measurements

During the different process steps described above the sheet resistances (ohm/square) at the different process steps were measured using a four point probe (by Jandel Engineering Limited) before the accelerated aging and thereafter using the two silver contacts using an Agilent digital multimeter. For each measuring point a sample of 18 pieces of 30×30 mm CNB squares were used. The results can be seen in table 1.

TABLE 1

Results of measuring the sheet resistance during the different process steps during the production of the electrically conductive multilayer films

| | Sheet resistance (ohm/square) | | | | | | |
|---|---|---|---|---|---|---|---|
| Conductive multilayer film | P-doping | Drying | Coating | Silver contact printing | Contact cleaning | Accelerated aging | Increase in sheet resistance after aging (%) |
| Film 1 | 64 | 60 | 62 | 63 | 64 | 69 | 7.6 |
| Film 2 | 65 | 61 | 67 | 68 | 68 | 83 | 22.3 |
| Film C | 64 | 59 | — | 65 | 74 | 94 | 26.7 |

Based on the received test results it could be seen that the electrically conductive multilayer films 1 and 2 are much more stable at high temperature and humidity compared to the comparative conductive multilayer film C.

Adhesion Test

The produced three electrically conductive multilayer films were thereafter subjected to an adhesion test in the following manner:

To evaluate the adhesion strength of the transparent layer comprising transparent conductor material to the non-conductive base layer, the sheet resistance (ohm/square) was first measured using a four point probe (by Jandel Engineering Limited). Then a 3M scotch transparent film tape 600 was applied thereon by directly pressing the tape onto the transparent layer comprising transparent conductor material by using hand pressure. After 10 seconds of waiting time the tape was peeled off in a controlled motion and the sheet resistance (ohm/square) was re-measured to evaluate how much of the transparent conductor material was removed.

The results can be seen in table 2.

TABLE 2

Results from the adhesion test

| Conductive multilayer film | Increase in sheet resistance (%) | Standard deviation (%) |
| --- | --- | --- |
| Film 1 | 0 | 0 |
| Film 2 | −3 | 1.3 |
| Film C | 9779 | 285.1 |

Based on the received test results it could be seen that with the conductive multilayer films 1 and 2, including the coating layer, a good bonding strength of the transparent layer comprising transparent conductor material could be achieved.

It is obvious to a person skilled in the art that with the advancement of technology, the basic idea may be implemented in various ways. The embodiments are thus not limited to the examples described above; instead they may vary within the scope of the claims.

The invention claimed is:

1. An electrically conductive multilayer film comprising a non-conductive base layer and a transparent layer comprising transparent conductor material provided on the non-conductive base layer, wherein the transparent layer is at least partly covered with transparent dielectric material forming a coating layer on the transparent layer such that the transparent layer is situated between the coating layer and the non-conductive base layer; and wherein the transparent conductor material further comprises a conductive high aspect ratio molecular structure (HARMS) network; wherein the conductive HARMS network comprises carbon nanostructures, and the transparent dielectric material is a polymer selected from a group consisting of polyvinylidene chloride (PVDC), a copolymer wherein one of the monomers is vinylidene chloride; poly(methyl methacrylate) (PMMA), and any combination thereof, and wherein the thickness of the coating layer is 50-150 nm in order to enable processing of the transparent layer through the coating layer.

2. The electrically conductive multilayer film of claim 1, wherein the thickness of the coating layer is 70-150 nm.

3. The electrically conductive multilayer film of claim 1, wherein the transparent conductor material is partly embedded in the transparent dielectric material such that at least part of the transparent conductor material is exposed.

4. The electrically conductive multilayer film of claim 1, wherein the transparent dielectric material further comprises a solvent, an optical absorbing additive, a dopant, an adhesion promoter, a hardener, or any combination thereof.

5. The electrically conductive multilayer film of claim 1, wherein the non-conductive base layer comprises or consists of polymer or glass.

6. The electrically conductive multilayer film of claim 1, wherein the conductive multilayer film comprises a transparent primer layer, which is situated between the non-conductive base layer and the transparent layer and is in direct contact with the transparent layer.

7. The electrically conductive multilayer film of claim 6, wherein the transparent primer layer is formed of a composition comprising a polymer selected from a group consisting of polyvinylidene chloride (PVDC), a copolymer wherein one of the monomers is vinylidene chloride, and any combination thereof.

8. The electrically conductive multilayer film of claim 7, wherein the thickness of the transparent primer layer is 50-1000 nm.

9. The electrically conductive multilayer film of claim 1, wherein the conductive multilayer film is formable, flexible, foldable, and/or stretchable.

10. A method for producing an electrically conductive multilayer film, comprising:
   providing a non-conductive base layer,
   providing a transparent layer comprising transparent conductor material on the non-conductive base layer, wherein the transparent conductor material comprises a conductive high aspect ratio molecular structure (HARMS) network, wherein the conductive HARMS network comprises carbon nanostructures,
   covering the transparent layer at least partly with transparent dielectric material to form a coating layer on the transparent layer such that the transparent layer is situated between the coating layer and the non-conductive base layer; wherein the transparent dielectric material further comprises a polymer selected from a group consisting of polyvinylidene chloride (PVDC), a copolymer wherein one of the monomers is vinylidene chloride, poly(methyl methacrylate) (PMMA), and any combination thereof, and wherein the thickness of the coating layer is 50-150 nm in order to enable processing of the transparent layer through the coating layer.

11. The method of claim 10, wherein covering the transparent layer at least partly with transparent dielectric material is carried out by using at least one of the following processes: slot die coating, meniscus coating, roller coating, screen printing, gravure coating, flexo coating, offset coating, knife coating, kiss coating, rod coating, blade coating, and physical vapor deposition.

12. A touch sensing device comprising an electrically conductive multilayer film of claim 1.

* * * * *